PROPANE GRAPH FOR % $CO_2$ vs % $O_2$ IN A STORAGE CHAMBER WHEN BURNER EXHAUST GASES CONTAIN 0.8% $O_2$ AND 12.5% $CO_2$.

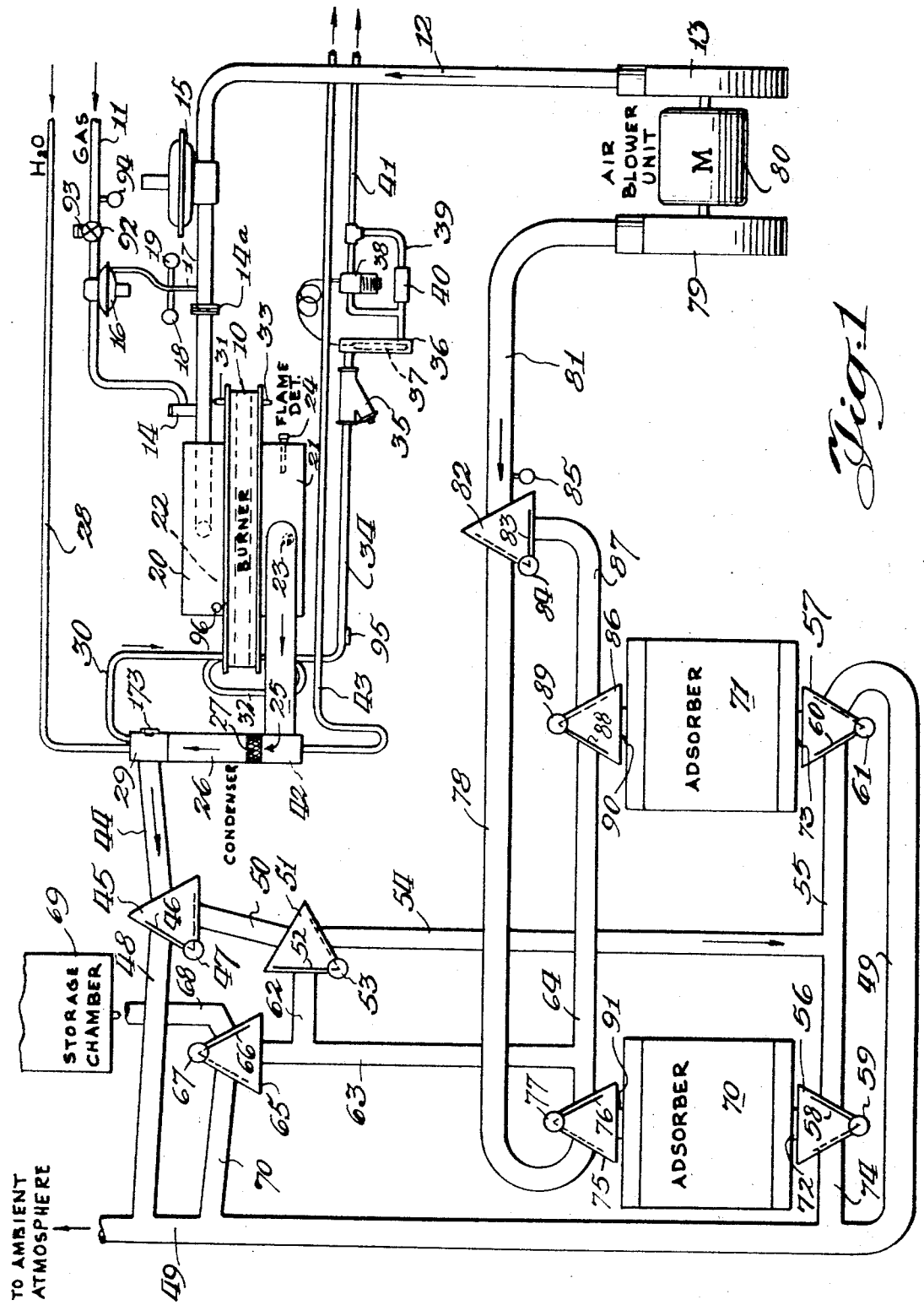

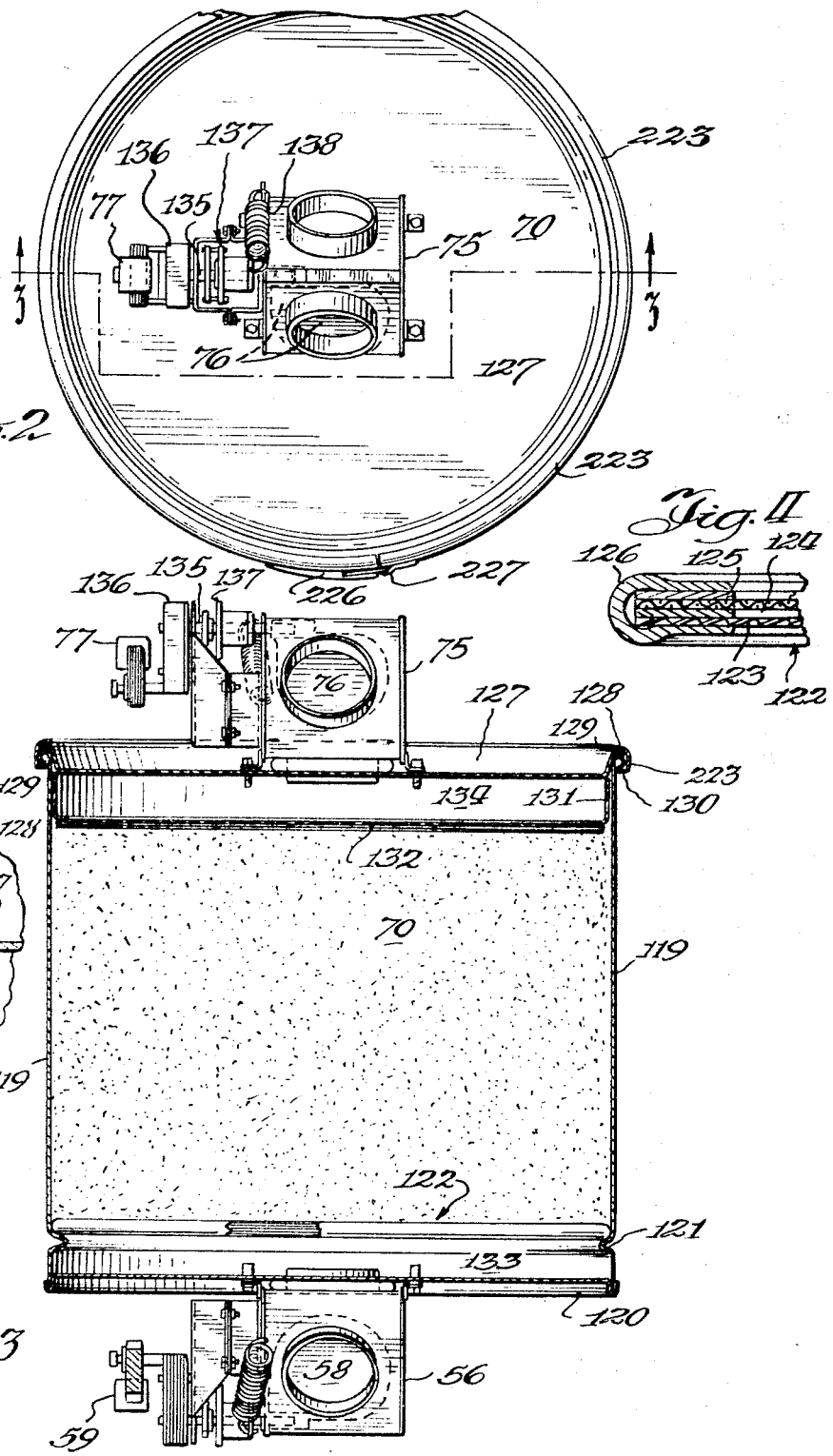

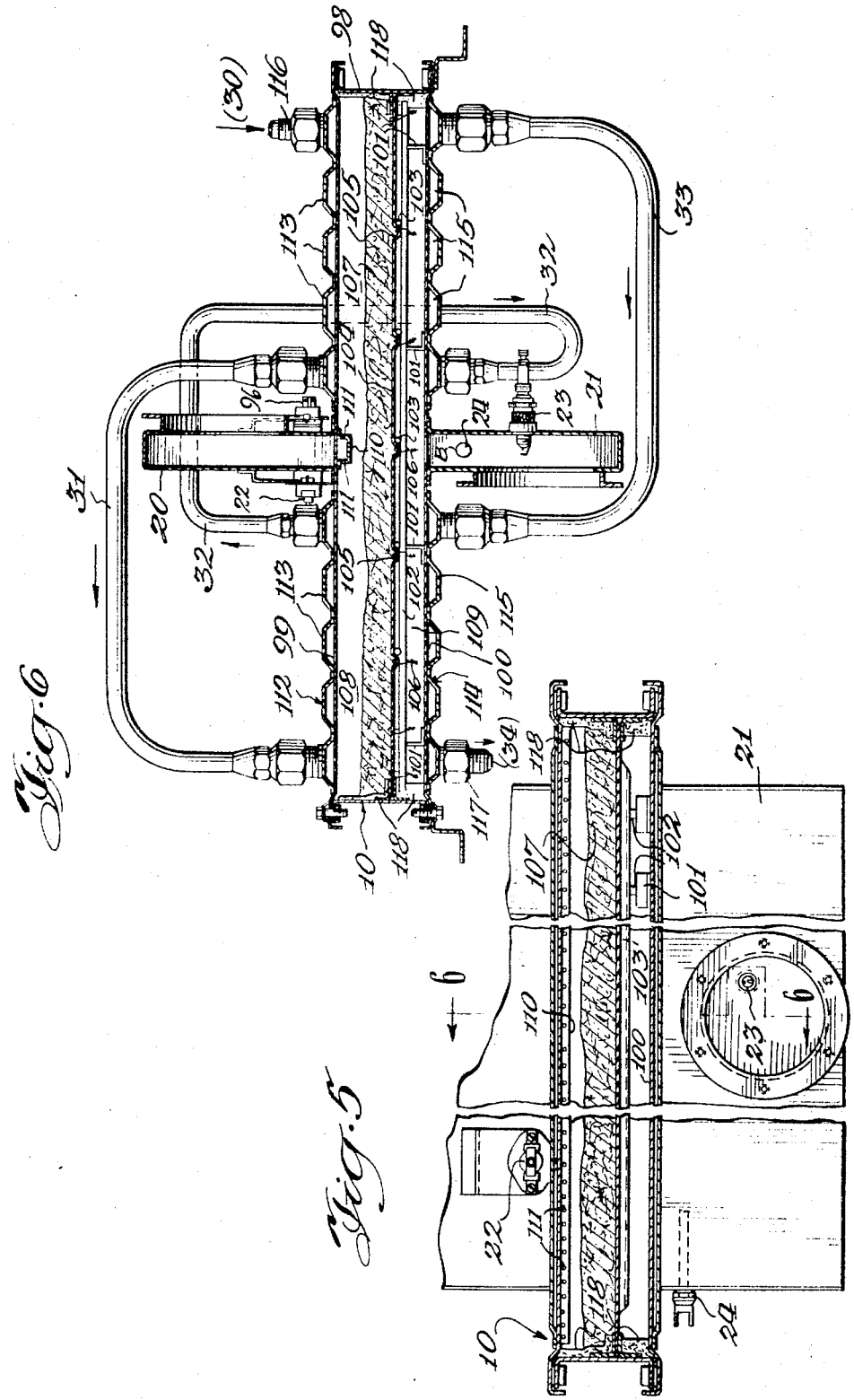

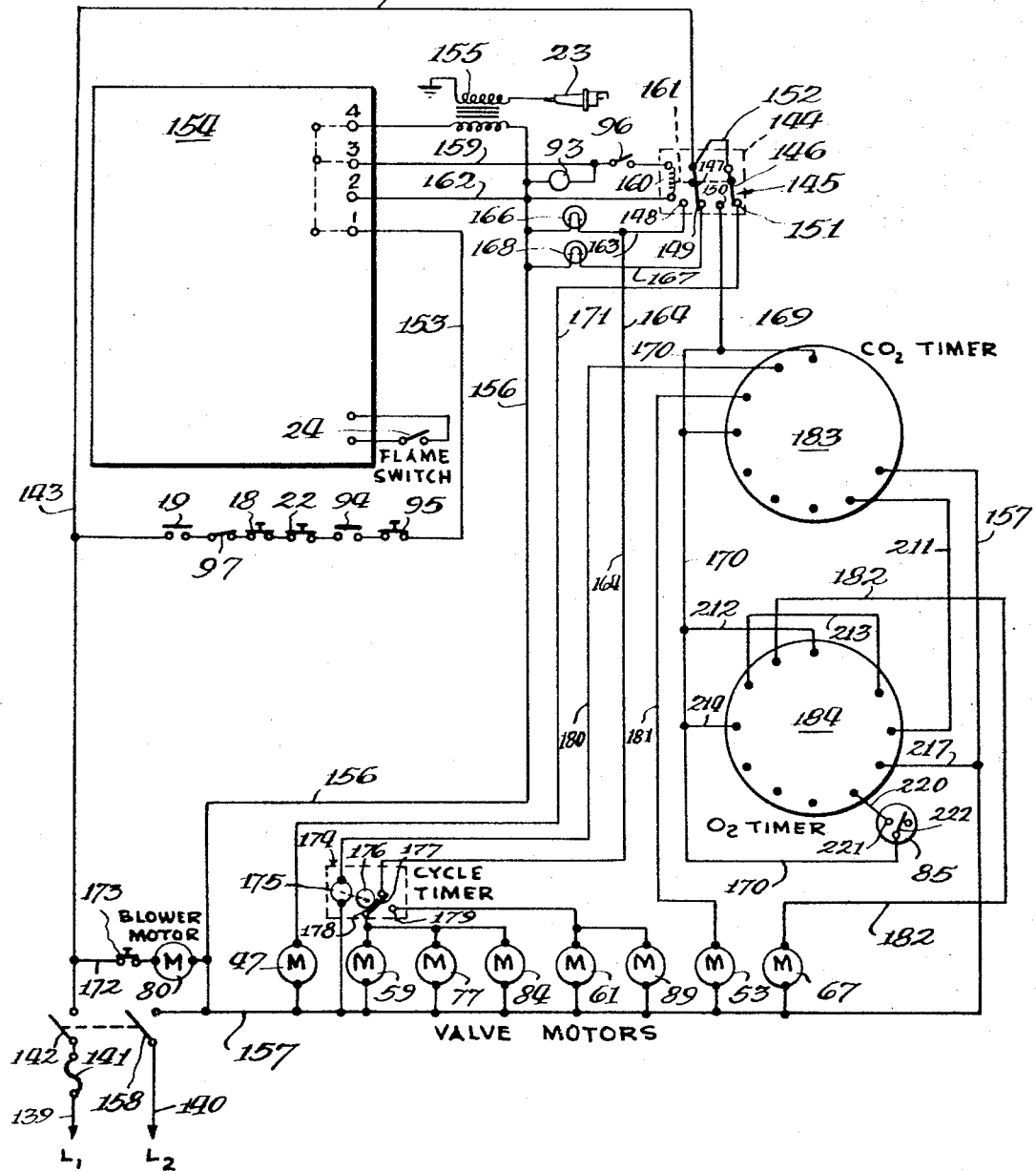

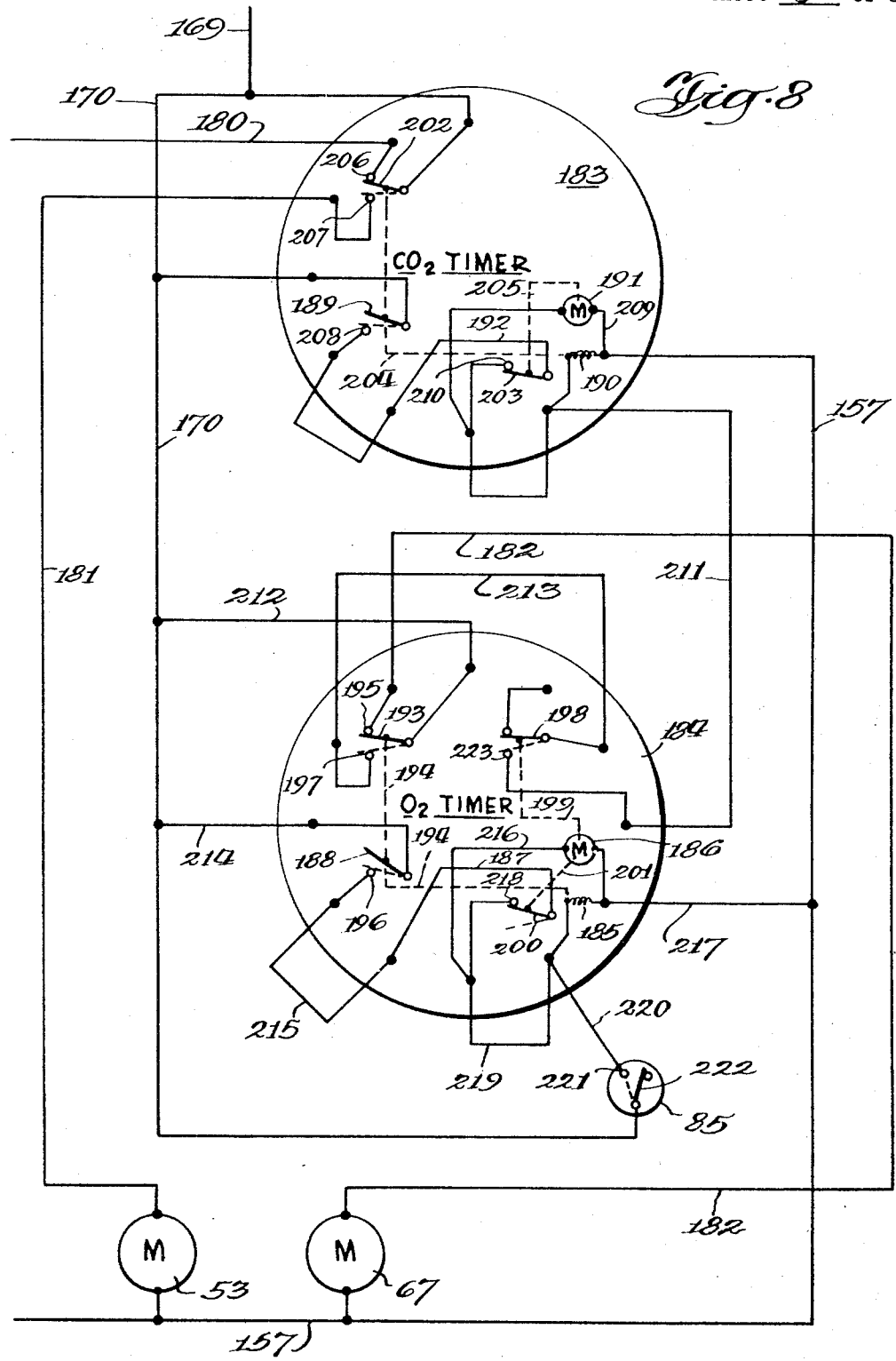

United States Patent Office 3,445,194
Patented May 20, 1969

3,445,194
APPARATUS FOR PROVIDING AN OXYGEN CONTAINING ATMOSPHERE
Jess W. Thomas, New York, N.Y., Joshua R. C. Brown, Chesterton, Ind., and James J. Anderson, Stevensville, Mich., assignors to Whirlpool Corporation, a corporation of Delaware
Filed Nov. 5, 1963, Ser. No. 321,626
Int. Cl. B01j 7/00; A23b 1/00; B01d 53/02
U.S. Cl. 23—281                                    5 Claims

ABSTRACT OF THE DISCLOSURE

An atmosphere generating system having a catalytic burner adsorption apparatus, an air source and fluid circuitry for providing and maintaining a food preserving atmosphere in a food storage container by flowing air through the adsorption apparatus, then flowing atmosphere through the adsorption apparatus to a place of disposal for a first predetermined time period, then flowing atmosphere directly to the storage container for a second predetermined time period, and then flowing atmosphere through said adsorption apparatus to the storage chamber to transfer the remainder of air to the container and provide a substantially hydrocarbon free atmosphere to the container for a third predetermined time period.

Summary of the invention

This invention relates to an apparatus for producing and maintaining an atmosphere in a receiver having preselected controlled amounts of oxygen and carbon dioxide.

One of the features of this invention is to provide an improved apparatus for producing and maintaining an atmosphere having preselected controlled amounts of oxygen and carbon dioxide for a receiver such as a storage chamber in which animal and vegetable materials may be stored.

Another feature of the invention is to provide an improved generator in the form of a catalytic burner and associated parts thereof for generating such an atmosphere by the combustion of a hydrocarbon fuel in the presence of excess air.

Another feature of the invention is to provide an improved automatic control apparatus as a part of the generating apparatus for providing automatic operation under the desired controlled conditions and in which these conditions can be altered as desired.

Other features and advantages of the invention will be apparent from the following description thereof, particularly as illustrated in the embodiments shown in the accompanying drawings. Of the drawings:

FIGURE 1 is a semi-diagrammatic view showing the relationship of the parts of this embodiment of the atmosphere producing apparatus.

FIGURE 2 is a fragmentary plan view of one of the absorbers forming a part of the apparatus of FIGURE 1.

FIGURE 3 is a sectional view taken substantially along line 3—3 of FIGURE 2.

FIGURE 4 is a fragmentary detail sectional view of a portion of the apparatus of FIGURE 3.

FIGURE 5 is a fragmentary side elevational view partially in section of a catalytic burner forming a part of the apparatus of this invention.

FIGURE 6 is a sectional elevational view taken substantially along line 6—6 of FIGURE 5.

FIGURE 7 is a schematic wiring diagram of the electrical circuit portion of the apparatus showing the parts of the automatic control.

FIGURE 8 is an enlarged detail of a portion of the electrical circuit of FIGURE 7.

FIGURE 10 is an enlarged detail cross section of FIGURE 3.

Figure 9:
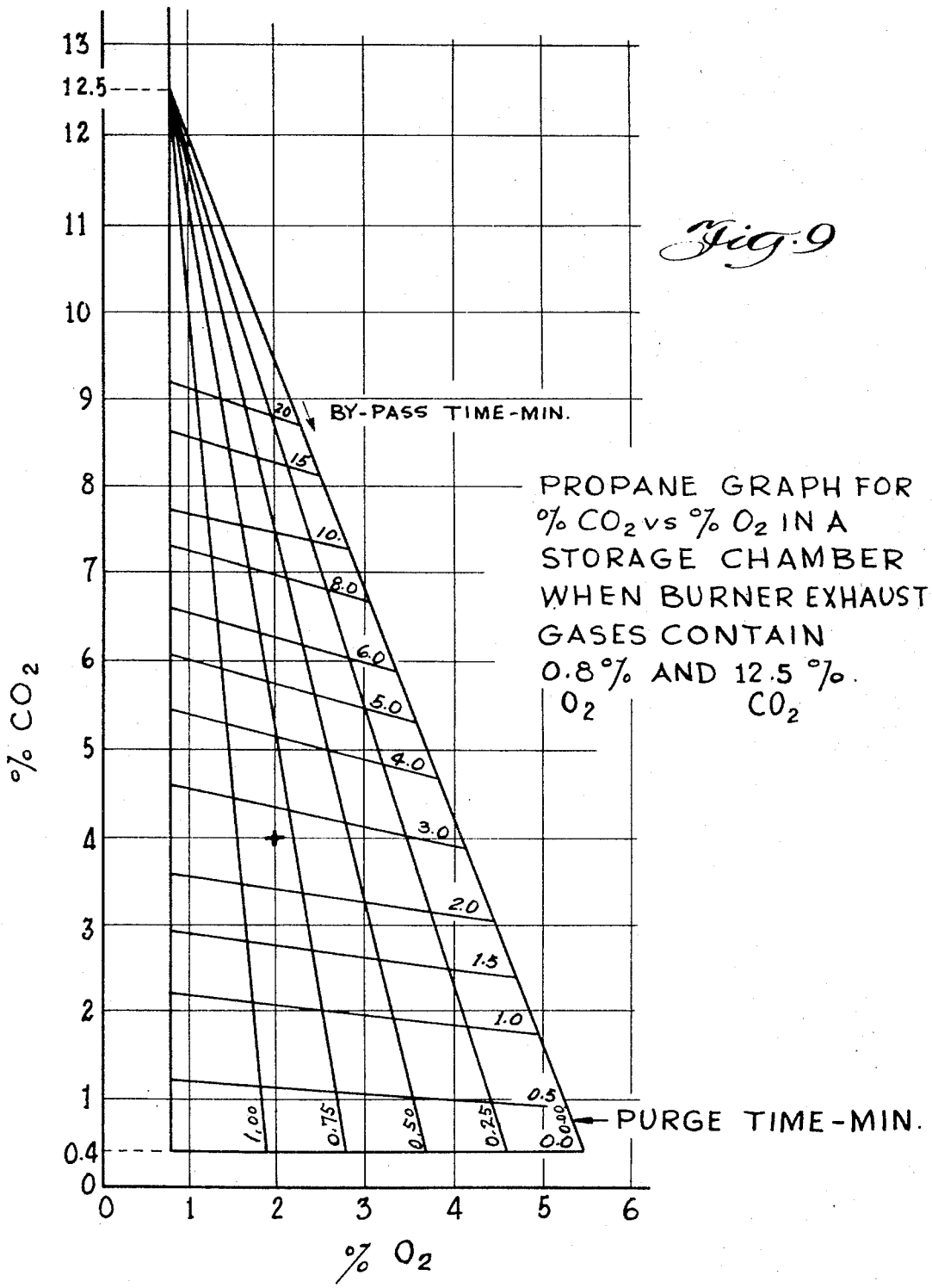
FIGURE 9 is a graph illustrating how the operating conditions may be changed with a typical burner to produce desired amounts of carbon dioxide and oxygen.

In Bedrosian et al. Patent 3,102,777, assigned to the same assignee as the present application, there is disclosed and claimed an apparatus and method for providing an atmosphere with controlled amounts of oxygen and carbon dioxide which may be used to provide a storage atmosphere in a receiver, such as a storage chamber, for the preservation of animal and vegetable materials. In the copending Lannert et al. application Ser. No. 213,-398, filed July 30, 1962, now Patent 3,205,049, also assigned to the same assignee, there is disclosed and claimed one form of an apparatus for producing such an atmosphere.

The present invention is a further development in this field and utilizes a catalytic burner generator with a pair of activated carbon adsorbers with one being used to adsorb undesirable gases such as ethylene and controlled amounts of carbon dioxide while the other is being regenerated by removing the adsorbed undesirable gases and carbon dioxide. The apparatus of this invention also utilizes a pair of variable timers with one being used to control the amount of oxygen provided to the receiver or storage chamber and the other regulating the amount of carbon dioxide provided to the receiver with both timers being readily adjustable so as to vary the amount of these two gases.

The system

As shown in FIGURE 1 there is provided a catalytic burner 10 that is supplied with a hydrocarbon fuel gas by way of a line 11 and pressurized air by means of a line 12 from a blower 13. The gas from the line 11 and air from the line 12 mix in the line 12 just before it enters the burner with the flow of gas being controlled by means of an adjustable orifice 14. In the air line 12 there is provided an air regulating valve 15 and a fixed orifice 14a while in the gas line 11 there is provided a gas regulator 16 that is connected by way of a line 17 to the air line 12. Attached to the gas regulator line 17 is a manually reset flash-back pressure switch 18 which is normally closed but which opens if there is flash-back in the burner 10 in order to shut off the system in a manner to be described hereinafter.

The gas regulator line 17 also contains an air pressure switch 19 which is normally open when the system is not operating but which is closed by air pressure when the amount of air provided by blower 13 is sufficient to support combustion of the burner 10. This prevents the system operating when there is insufficient air pressure.

The gas and air mixture enters the burner 10 at the intake manifold 20 on the top of the burner and the products of combustion leave through the exhaust manifold 21. Located in the intake manifold 20 is a manually reset flash-back thermostat 22 above the catalytic portion of the burner 10 that is normally closed but is opened by any series of flash-back burning within the manifold 20. This thermostat switch 22 is an added safety device functioning in combination with the more remote flash-back pressure switch 18.

Ignition of the gases within the burner 10 is accomplished by means of a spark plug 23 in the exhaust manifold 21. This exhaust manifold is provided with a flame detection switch 24 which detects burning and closes the electrical circuit to the controls to be described hereinafter for proper operation of the apparatus.

The products of combustion from the burner 10 containing oxygen, carbon dioxide and inert gases from the air flow through an exhaust line 25 to a water cooled condenser 26 where condensible vapors are removed from the exhaust. The condenser contains a flame arrester 27 to prevent any burning past this point within the generator.

For cooling purposes there is provided a water inlet line 28 leading to the top plenum 29 and then to coils (not shown) within the condenser 26. From here the water flows through a line 30 to the top of the burner 10. Water flows through this top of the burner from one portion to another through a jumper tube 31 and from the top of the burner to the bottom thereof through a jumper water line 32. Water flows through this bottom of the burner 10 by way of another jumper line 33 and flows from the burner by way of an outlet line 34. The details of construction of the burner and its parts including the cooling water lines are presented later.

In the exhaust water line 34 there is provided a strainer 35 for straining out any solid particles and from here the outlet water flows through a chamber 36 in which is contained a sensing bulb 37 for a modulating water valve 38. A water line 39 is provided leading from the chamber 36 by way of a flow control valve 40. With this arrangement flow of exhaust water from the burner 10 is controlled by the temperature of the water in the manner explained in the above-mentioned copending application Ser. No. 213,398. From this control apparatus the water exhausts through an exhaust line 41.

Condensate from the condenser 26 flows from the condenser by way of a lower plenum 42 and a condensate disposal line 43.

From the condenser 26 a gas conduit 44 leads to a valve 45 having a damper 46 therein operated by a motor 47. From this valve 45 a conduit 48 leads to a conduit 49 which exhausts to atmosphere.

From the valve 45 a conduit 50 leads to a valve 51 having a damper 52 whose operation is controlled by a motor 53. From this valve 51 a conduit 54 leads to a conduit 55, one end of which leads to a valve 56 and the other end leads to a valve 57. The valve 56 has a damper 58 operated by a motor 59 while the valve 57 has a similar damper 60 operated by a motor 61.

Also leading from the valve 51 is a conduit 62 intersecting a conduit 63 which intersects at one end a conduit 64 and connects at the other end to a valve 65. This valve like the others has a damper 66 operated by a motor 67.

The valve 65 communicates by way of a conduit 68 with a storage chamber identified diagrammatically in FIGURE 1 at 69. The valve 65 also communicates by way of the conduit 70 with the previously mentioned conduit 49.

Valve 56 is located at the bottom of adsorber 70 which is one of a pair of adsorbers with the other being identified at 71. Valve 56 communicates with the bottom of the adsorber 70 through a conduit 72 while valve 57 is provided with a similar conduit 73. Valve 56 also communicates by way of a conduit 74 with the exhaust conduit 49.

At the top of the adsorber 70 there is provided a valve 75 having a damper 76 operated by a motor 77. One side of this valve communicates with the previously mentioned conduit 64 while the second side communicates with a conduit 78 which is part of an air line leading from a second blower 79. Both blowers 13 and 79 are operated by a common motor 80 and a conduit 81 leads from blower 79 to a valve 82 having a damper 83 operated by a motor 84.

Located between the blower 79 and the valve 82 is a normally open air pressure pulse switch 85 adapted to be momentarily closed by pressure pulses in the conduit 81.

The valve 82 communicates with conduit 78 and also with a valve 86 at the top of adsorber 71 by way of a conduit 87. The valve 86 is provided with a damper 88 operated by a motor 89. Valve 86 communicates with the top of adsorber 71 through a conduit 90 and corresponding valve 75 is provided with a similar conduit 91.

Also in the system of FIGURE 1 as well as certain other figures there is a gas valve 92 in the gas line 11 operated by a solenoid 93. There are also control thermostats and switches including a fuel pressure switch 94 that is normally open when the system is not in operation but which is closed by the fuel pressure when the fuel supply is adequate for the proper operation of the system. This fuel pressure switch is illustrated in the circuit wiring diagram of FIGURE 7. There is also provided a cooling water thermostat 95 in the cooling water exit line 34 which is normally closed but which opens to break the electric circuit, as shown in FIGURE 7, if the cooling water is excessively hot which would indicate improper operation of the burner, or inadequate water supply.

The burner 10 is provided with an operation sensor 96 immediately above the burner which is normally open when the system is not operating but which is closed by the heat of the burner when the system is operating normally. In the electrical circuit, as shown in FIGURE 7, there is provided an ignition switch 97 which is normally closed whether or not the system is operating and is open only for interrupting the electrical circuit when such is desired as for servicing various parts thereof.

The dampers of all the valves in FIGURE 1 are shown in their de-energized (spring loaded) solid line positions. When the respective electric motor for each damper is energized, that damper then moves to the dotted line position, also shown in FIGURE 1. The electrical circuit timers and other operating controls for these various valves are described in detail hereinafter.

The generator

The catalytic burner or generator 10 is shown in detail in FIGURES 5 and 6. The burner comprises an enclosing frame 98 that is generally rectangular and arranged horizontally. This frame has a spaced top 99 and bottom 100 that are substantially parallel to each other. The bottom 100 is provided with upwardly extending spaced brackets 101 of L shape having coplanar tops. Certain of these brackets are shown in end elevation in FIGURE 6 and in side elevation in FIGURE 5. In FIGURE 5 only two of the brackets are shown, it being understood that other brackets (in the preferred embodiment some 40 in number) are provided spaced apart along the entire bottom 100.

The tops of the brackets support parallel rod members 102 that are of square cross section, as shown in FIGURE 5, and these in turn support spaced parallel second rod members 103 that are at substantially right angles to the rod members 102. The first rod members 102 are square so that they will not roll under the forces of heating and cooling within the burner.

Supported on the assembly of rod members 102 and 103 is a perforated supporting screen 104 of the type shown and described in R. I. Ranum copending application Ser. No. 213,397, filed July 30, 1962, now Patent 3,203,770, also assigned to the same assignee as the present application.

The screen 104 is provided with parallel strengthening ribs 105. The screen is loosely attached to the rod members 102 by spaced loose wire ties 106.

The screen 104 supports a granular catalytic bed 107 which is illustrated, broken away, in FIGURE 5. This bed 107 is as described in the above-mentioned Ranum application and is a well known material for providing low temperature burning of fuel in the presence of the fuel in the presence of the oxygen in the air.

The burner 10 is provided with a top plate 99 as previously mentioned that is spaced from the top of the bed 107 to provide an upper space 108. The burner is also provided with the above-described bottom plate 100 spaced from the bottom of the bed as defined by the screen 104 to provide a bottom space 109.

The intake manifold 20 to the burner communicates with the top of the space 108 by means of an air-gas distributor channel 110 mounted on the bottom surface of the top plate 99 to receive gas and air mixture from the manifold 20. The sides of this channel 110 are provided with outwardly extending openings 111 that are closely spaced along the length of the channel which extends the full length of the burner frame 98. These small openings are spaced about a quarter of an inch apart and project jets of gas and air mixture laterally above the catalyst bed 107. The bottom manifold 21 contains the spark plug 23 which initiates the burning.

In order to cool the burner in the manner and for the purposes disclosed in the above-mentioned Ranum application there is provided a water jacket plate 112 on the outer surface of the top plate 99 having parallel adjacent water passages 113 therein. The bottom plate 100 is provided with a similar water jacket plate 114 provided with water passages 115 therein. The passages 113 on one side of the manifold 20 are arranged in series flow relationship and the passages 113 on the other side of the manifold are similarly arranged in series flow. In the lower water jacket 114 the passages 115 on opposite sides of the manifold 21 are arranged in the same manner.

The various sets of passages are connected in series by the previously described jumper line 31, jumper line 32 and jumper line 33 for water flow through these passages in series. The water enters through a fitting 116 which is attached to water line 30 (FIGURE 1). The water leaves through fitting 117 which is attached to water outlet line 34 (FIGURE 1).

The manual reset flash-back thermostat 22 is located on the outside of intake manifold 20 at one side thereof while the operation sensor 96 is also located on the outside of the intake manifold on the opposite side thereof. The flame detection switch 24 that was previously described is located in the outlet manifold 21 at one end thereof.

In order to reduce heat loss from the burner 10 including that part surrounding the sides of the bed 107 and the sides of the top space 108 and bottom space 109, there is provided temperature resistant insulation 118, as shown in FIGURES 5 and 6.

The adsorbers

Each of the adsorbers 70 and 71 is identical in structure and so only adsorber 70 will be described in detail as representative of the two. The adsorber is illustrated most clearly in FIGURES 2 and 3. The adsorber 70 is illustrated without the finely divided activated carbon which is the adsorbing medium, as described in Brown et al. copending application Ser. No. 213,520, filed July 30, 1962, now Patent 3,203,771 also assigned to the same assignee.

The adsorber has a cylindrical shell 119 of sheet metal and the like with permanently attached metal bottom 120. Above this bottom there is an inwardly extending annular groove 121 on which is held the support 122 for the bed of activated carbon (not shown). This support comprises an expanded metal grating 123 on which is positioned a metal screen 124. Edge reinforcements 125 are provided and the whole is retained in the assembly by an enclosing rubber channel 126. It is the channel which contacts the top surface of the metal forming the groove 121.

The shell 119 is provided with a removable cover 127 of sheet metal on which is located the top valve 75. The bottom valve 56 is mounted on the bottom closure 120. The top cover 127 is releasably sealed to the top of the cylindrical shell 119 by a rubber basket 128 held in an inverted rim channel 129 on the cover 127 and bearing against an edge bead 130 at the top of the shell 119. A split ring 223 having tapered surfaces 224 and 225 forces the inverted rim channel 129 of top cover 127, rubber gasket 128 and edge bead 130 into sealing engagement when the handle 226 of toggle clamp 227 is positioned as shown in FIGURE 2.

Beneath the removable cover 127 there is provided a removable cylindrical retainer 131 that is relatively shallow and that supports a circular screen 132 similar to the bottom screen 124. The bottom plate 120 is spaced from the bottom support 122 to provide a manifold space 133. The retaining screen 132 at the top is similarly spaced from the cover 127 to provide a manifold space 134. As mentioned previously the cover 127 is removable by merely lifting up after ring 223 is removed. The screen retainer 131 is similarly removable as it is loosely positioned in the void between the cover 127 and the activated carbon (not shown).

In order to operate the upper damper 76 there is provided at one side the motor 77. This motor operates a shaft 135 by way of a gear transmission 136 and a clutch arrangement 137. A spring 138 is provided to urge the damper 76 toward its normal solid line position as shown in FIGURE 1.

The bottom valve 56 is provided with a similar motor 59 and operating gear transmission, clutch and spring.

The electrical control circuit

The control circuit for the embodiment of the invention disclosed in the drawings is shown in FIGURE 7 with the timers and adjacent portions of the circuit shown in FIGURE 8.

The apparatus is supplied with power from two electric leads 139 and 140. A customary fuse 141 is provided as well as a double pole master line switch 142.

From one side of the switch 142 there is provided an electric line 143 to a relay 144. This relay is provided with a double pole double throw switch 145 having two poles 146 and 147 and four contacts 148, 149, 150 and 151. The two poles 146 and 147 are connected by a lead 152.

From the line 143 a line 153 is connected to an ignition control 154. This is a conventional ignition control system commonly used with oil or gas burners and is a readily available commercial unit. The control functions to connect terminal 1 to terminals 3 and 4, as indicated by the dotted lines on FIGURE 7, for a predetermined period of time that may be set on the control 154. Upon the expiration of this predetermined or preselected time, terminal 1 will automatically be disconnected from terminals 3 and 4 unless the flame detector switch 24 has closed to indicate the presence of flame in the burner. If the flame switch 24 closes before the expiration of the predetermined time, terminal 1 will be disconnected from terminal 4 but remains connected to terminal 3.

In line 153 are the various switches previously described which are used to insure that the apparatus of this invention is functioning properly. Thus, these switches which are connected in series include the air pressure switch 19 which closes when there is a proper amount of air for efficient combustion, ignition switch 97 which is normally closed at all times and is customarily only opened when it is desired to remove the control 154 from the circuit as for servicing or the like. Other switches in this series are the flash-back pressure switch 18 which is a safety switch and which is normally closed unless there has been a flash-back of flame in the burner, the manually reset flash-back thermostat 22 which is normally closed and located on the intake manifold monitors high temperatures caused by flash-back burning within manifold 20, and a fuel pressure switch 94 that is normally open but is closed when the gas in the system is at sufficient pressure for efficient burning. Finally in this series of switches is the cooling water thermostat switch 95 which is normally closed but opens if the cooling water from the burner 10 is excessively hot. The location of these various switches in the system are shown in the other views and have been described.

Typical operating conditions for the apparatus of this invention involve combustion within the burner 10 at a temperature below about 2000° F. in order to prevent formation of harmful oxides of nitrogen. The power supply is a conventional 115 volt 60 cycle alternating current supply and the settings for the various thermostats and pressure switches in one embodiment may be as follows: The safety thermostat 173, normally closed, is set to open at 145° F. the cooling water thermostat 95, normally closed, is set to open at 190° F., the air pressure switch 19 is arranged to close at a pressure of about 2.5 inches of water, the flash-back pressure switch 18 is set to open at a pressure of about 5.7 inches of water, the fuel pressure switch 94 closes at a pressure of about 4.0 inches of water, the flash-back thermostat 22 is normally closed but opens at about 325° F. which has been found sufficient to show excessive flash-back, the operation sensor 96 closes at about 175° F. and the flame detection switch 24 which is normally open closes when the temperature of the gases in the exhaust manifold 21 are about 375° F. These values, of course, are only given for one embodiment of the invention and may be varied.

Terminal 4 on the control 154 is connected to a transformer 155 which operates the spark plug igniter 23. The other side of the transformer 155 is connected by a line 156 to a line 157 which is in turn connected to the second pole 158 of the switch 142.

Terminal 3 of control 154 is connected by line 159 to the operation sensor thermostat 96 previously described. Between line 159 and line 156 is connected the solenoid 93 for the gas valve 92, both previously described.

The other side of the operation sensor 96 is connected to an operating solenoid 160 for the relay switch 145 with the mechanical connection of the solenoid 160 to the switch poles 146 and 147 being indicated by the dotted line 161.

The other side of the solenoid 160 is connected by line 162 to line 156 and also to terminal 2 of control 154.

Terminal 148 of the four terminals on the relay 144 is connected to line 163 which is connected to line 164 and to a light 166 whose other side is connected to the line 156.

Another terminal 149 on the relay 144 is connected by a line 167 to an indicator light 168 whose other side is also connected to the line 156.

The third relay terminal 150 is connected by line 169 to a line 170, while the fourth terminal 151 of the relay is connected by a line 171 to the motor 47 of a by-pass valve 45.

Between the lines 143 and 156 of opposite sides of the switch 142 there extends a line 172 in which is located the blower motor 80 for operating the two blowers 13 and 79. Also in the line 172 is a manually reset, normally closed, safety thermostat 173 that is located at the gas outlet of the condenser 26 that opens to stop the blower 80 if the temperature in the condenser plenum 29 becomes too great.

The electrical system also includes a cycle timer 174 having an operating motor 175 that operates a cam 176 to move a switch arm 177 between a pair of contacts 178 and 179. One side of the motor 175 is connected to a line 180 while the other side is connected to the line 157. Each of the valve motors 47, 59, 77, 84, 61, 89, 53 and 67 is connected to this line 157 so that all of these motors are in parallel.

As shown in FIGURE 7 valve motors 59, 77 and 84 are connected to contact 178 of the cycle timer while valve motors 61 and 89 are in parallel with each other and connected to the other timer contact 179. Valve motor 53 is connected to line 181 while valve motor 67 is connected to line 182.

The movable switch arm 177 on the cycle timer is connected by the previously mentioned line 164 to line 163 from the relay 144.

As is shown in greater detail in FIGURE 8 the electrical control system includes two adjustable timers, one of which is a carbon dioxide timer 183 and the other is an oxygen timer 184. These timers are manually adjustable to operate for preselected times and are capable of resetting automatically at the end of the preselected time period. They are commercially available and are known as "Cycl-Flex" timers. The only difference in construction between the two timers is the length of time cycle. Timer 184 has a time cycle which may be varied from 0 to 120 seconds. Timer 183 has a time cycle which may be varied from 0 to 30 minutes. Timer 183 does not utilize the switch (not shown) comparable to switch 198 of timer 184.

Timer 184 includes a first energizable means shown as a solenoid 185 and a second energizable means shown as a motor 186. This timer also includes a first electrical circuit 187 extending to a first switch 188 with this first switch 188 being connected by way of line 170 to a switch 189 in the other or carbon dioxide timer 183. This timer 183 contains a first energizable means in the form of another solenoid 190 similar to the solenoid 185 and a second energizable means shown as a motor 191 similar to the motor 186. The timer 183 also contains an electrical circuit 192 that is similar to the electrical circuit in the oxygen timer 184.

In addition to the switch 188 the oxygen timer 184 contains a normally closed switch 193 with these two switches being operated by the solenoid 185 as indicated by the dotted line 194. When solenoid 185 is not energized the switch 188 is in the open position shown while switch 193 engages contact 195. When the solenoid 185 is energized the two switches are moved down from their solid positions to their dotted line positions as shown in FIGURE 8 to engage contacts 196 and 197 respectively.

Oxygen timer 184 also contains a switch 198 that is operated by the motor 186 as indicated by the dotted line 199 and a switch 200 that is also operated by the motor 186 as indicated by the dotted line 201.

Carbon dioxide timer 183 also contains a switch 202 similar to the switch 193 of the oxygen timer and a switch 203 similar to the switch 200 of the oxygen timer. Switches 189 and 202 are operated by the solenoid 190 as indicated by the dotted line 204 while switch 203 is operated by the motor 191 as indicated by the dotted line 205. When the solenoid 190 is de-energized switch 202 engages contact 206 and when solenoid 190 is energized switch 202 engages contact 207 and switch 189 engages contact 208.

As shown at the top of FIGURE 8 switch 202 is connected to line 170 while contact 206 is connected to line 180. Contact 207 is connected to line 181 and switch 189 is connected to line 170. Contact 208 is a part of the second circuit 192 and the motor 191 is in its own circuit 209, one side of which is connected to line 157 and the other side of which is connected to contact 210 of switch 203 and to a line 211.

As is shown in the lower portion of FIGURE 8, the oxygen timer 184 switch 193 is connected by line 212 to line 170. Contact 195 is connected to line 182 while contact 197 is connected by line 213 to switch 198. Also in timer 184 switch 188 is connected to line 170 by line 214 while contact 196 is connected by line 215 to line 187 which in turn is connected to switch 200. The motor 186 is in its own line 216, one end of which is connected to line 157 by way of a line 217 and the other end of which is connected to a contact 218 of switch 200. Contact 218 is also connected by lines 219 and 220 to the air pressure pulse switch 85 previously described. The line 220 is connected to one contact 221 of the swtich 85 and the switch is provided with a movable arm 222 that is normally out of engagement with contact 221 but which is moved into engagement by surges of air pressure within the conduit 81 from the blower 79.

*Operation*

With the gas supply through the line 11 and the air supply from the blower 13 both being of sufficient pressure for proper operation of the burner and with all of the precautionary safety switches including the air pressure switch 19, ignition switch 97, flash-back pressure switch 18, flash-back thermostat 22, gas pressure switch 94 and the cooling water temperature thermostat 95 functioning properly, indicating proper operating conditions for the burner, the circuit from line 143 to terminal 1 of the control 154 will be completed. This causes current to flow into the transformer 155 by way of terminals 1 and 4 of the control 154 to energize the spark plug 23 and ignite the fuel in the catalytic burner 10. Current flowing from terminal 3 of the control 154 energizes the gas valve solenoid 93 to open the gas valve 92. Current flowing from line 143 to the double pole double throw relay switch 145 and through switch arm 147 to line 167 energizes the indicator light 168 to show that the apparatus is functioning. Similarly, current flowing from line 143 through pole 146 of the switch energizes valve motor 47 to move the damper 46 of by-pass valve 45 (fifth valve) to its dotted line position as shown in FIGURE 1 so that the initial products of combustion will pass into line 48 and from there to the ambient atmosphere through line 49. This is a precautionary measure, as often the initial products of combustion are contaminated by unburned gases and are therefore vented during this initial period.

As mentioned earlier, the control 154 connects terminal 1 to terminals 3 and 4, as illustrated by the dotted lines in FIGURE 7, for a predetermined period of time. Upon the expiration of this predetermined period, which is usually about 70 seconds, terminal 1 will automatically be disconnected from terminals 3 and 4 unless flame detector switch 24 has closed. If switch 24 closes before the expiration of the predetermined time interval, terminal 1 is disconnected from terminal 4 but remains connected to terminal 3 to keep the gas valve open. This automatic disengagement of terminals 3 and 4, if switch 24 is not closed by flame in the burner, is a safety device in order to shut off both the sparking of the igniter plug 23 and the gas supply as under these conditions the burner would not be operating properly.

If the burner continues to operate properly, the operation sensor 96 closes to energize the solenoid 160 of relay 144 and move the relay switch poles 147 and 146 out of engagement with contacts 149 and 151 and into engagement with contacts 148 and 150. This breaks the circuit to the by-pass valve motor 47 so that the products of combustion are no longer vented to the atmosphere. The engagement of pole 146 with contact 150 energizes the cycle timer motor 175 by way of switch 202 of the carbon dioxide timer 183 as shown in FIGURE 8. The electric energy to switch 202 is supplied by line 169.

The engagement of switch pole 147 with contact 148 operates through switch 177 of the cycle timer to energize valve motors 59 (first valve), 77 (second valve) and 82 (sixth valve) and moves dampers 58 and 76 to their dotted line positions which serves to place adsorber 70 in the circuit from the condenser 26. The energizing of motor 84 also moves damper 83 to its dotted line position so that air from the blower 79 then flows down through the adsorber 71 by way of line 81, valve 82 (sixth valve), line 87 and valve 86 (eighth valve) to rejuvenate the adsorber 71 by removing previously adsorbed carbon dioxide. The air then flows out the bottom of adsorber 71 and through valve 57 (seventh valve) and line 49 to the ambient atmosphere.

The moving of damper 83 to its dotted line position as described above causes a momentary air pulse in line 81 to operate switch 85 and move the arm 222 into momentary engagement with contact 221 (FIGURE 8).

The engagement of the arm 222 with contact 221 in the impulse switch 85 energizes solenoid 185 from power supplied by way of lines 220 and 170 and pole 146 of switch 145 which, as described above, is still in engagement with the contact 150. This arrangement means that power is supplied to line 170 from line 143 and connecting line 169.

The momentary closing of switch 222 energizes solenoid 185 and causes it to move switches 188 (first switch) and 193 (fourth switch) of oxygen timer 184 downwardly. This means that switch 188 engages contact 196 and switch 193 engages contact 197.

Because the by-pass valve motor 47 is out of the circuit in the manner previously described combustion products now flow from the condenser 26 through line 44, valve 45 (fifth valve), line 50, valve 51 (fourth valve), line 54 (first conduit), line 55 and open valve 56 (first valve) to the adsorber bed 70 for flow upwardly through the adsorber. The gases then flow through the open valve 75 (second valve) into line 64, line 63 (second conduit), valve 65 (third valve) and line 70 (third conduit) to exhaust line 49 which exhausts to the atmosphere.

This upward flow of burner gases through adsorber 70 proceeds for a preselected time that was set on the oxygen timer 184. As the adsorber 70 had been previously flooded with air in a previous cycle, much as adsorber 71 is now being flooded with air from blower 79 in the manner previously described, by exhausting a portion of the air in adsorber 70 to the ambient atmosphere for a preselected time as determined by the oxygen timer 184, all but a predetermined amount of air is removed from the adsorber. In other words, the combustion products purge air from the adsorber until the predetermined desired amount remains which will be determined by the time set on the oxygen timer 184. At a later stage, to be described hereinafter, this remaining entrapped air which is of course made up of approximately 21% oxygen is transferred from the adsorber into the storage chamber 69.

As the oxygen timer 184 has in the above manner provided for the preselected amount of oxygen with this being retained in the adsorber 70 for later use, the carbon dioxide timer now takes over to control the amount of carbon dioxide introduced into the storage chamber 69.

At the end of the preselected time, as set on the oxygen timer 184 in the manner described above, the motor 186 of the oxygen timer pulses switch 198 (third switch) down to engage the bottom contact 223. As switch arm 193 is still in engagement with contact 197, this causes current to flow from line 170 through line 212, switch 193, contact 197, line 213, switch 198, contact 223 and line 211 into solenoid coil 190 (first energizable means) of the carbon dioxide timer 183. It also causes current to flow through motor 191 (second energizable means) of the carbon dioxide timer by way of the motor circuit 209. The other side of the current supply is provided by the line 157. This energizing of solenoid 190 moves switches 189 (second switch) and 202 (third switch) down to engage contacts 208 and 207, respectively. The energizing of the solenoid 190 and motor 191 starts the operation of the carbon dioxide timer 183. This de-energizes cycle timer motor 175 since switch arm 202 breaks contact with contact 206 and energizes valve motor 53 when switch arm 202 engages contact 207 to move valve damper 52 to the dotted line position so that this valve damper is moved along with those of previously energized valve motors 59, 77 and 84 which are still energized. During this period the adsorber 71 is still being reactivated with air blown through it from blower 79, as described above.

The carbon dioxide timer 183 continues to operate by reason of the moving down of the switches 189 and 202, as described above. Immediately with the closing of these switches, switch 200 (second switch) of the oxygen timer 184 is momentarily opened by motor 186 (second energizable means) through its connection therewith, as indicated at 201, and this breaks the circuit to the holding solenoid 185 (first energizable means) thereby permitting switches 193 and 188 of the oxygen timer 184 to return to their up position as shown in FIGURE 8. This results in valve motor 67 then being energized by power supplied from line 170 by way of line 212, switch arm 193, contact 195 and line 182 to the motor 67. The energizing of motor 67 moves valve damper 66 to its dotted line position as shown in FIGURE 1. With valve motors 59, 77, 84, 53 and 67 now energized, the carbon dioxide rich gases from the condenser 26 now flow through line 44, valve 45, line 50, valve 51 (fourth valve), line 62, valve 65 (third valve) and line 68 into the storage chamber 69.

During this period, as previously mentioned, timer motor 175 is de-energized as this supplying of the storage chamber with gases rich in carbon dioxide by-passes adsorber 70 which still contains the entrapped oxygen containing air, as previously described. This condition of supplying carbon dioxide rich gases directly to the storage chamber continues for the preselected time set on the carbon dioxide timer 183 to provide a predetermined amount of carbon dioxide in the chamber. At the end of the preselected time, interval switch 203 of the carbon dioxide timer is pulsed open by timer motor 191 to open the circuit to the solenoid holding coil 190. This stops the operation of the carbon dioxide timer and it automatically resets itself to zero in preparation for later starting a new carbon dioxide portion of the cycle.

With the de-energizing of solenoid 190 switches 189 and 202 return to their solid line positions, as shown in FIGURE 8, with switch 202 moving out of engagement with contact 207 and into engagement with contact 206. This breaks the circuit to valve motor 53 so that now only valve motors 59, 77, 84 and 67 are energized. At the same time the cycle timer motor 175 is energized by way of line 180, contact 206 and switch 202 in the carbon dioxide timer 183, line 169, contact 150, pole 146 and line 143. With this arrangement the combustion gases now pass from the condenser 26 through line 44, valve 45, line 50, valve 51, line 54, line 55, valve 56, adsorber 70, valve 76, line 63, valve 65 and line 68 into the storage chamber 69. The passage of these gases through the adsorber 70 not only removes carbon dioxide from the gases, with the carbon dioxide being adsorbed by the adsorber, but also carries the previously predetermined amount of oxygen that had been held all this time in adsorber 70 into the storage chamber 69 along with the above carbon dioxide free gases.

The length of time that the gases are passed through the adsorber 70 in this manner is controlled by the cycle timer 174. At the end of the preset time on the cycle timer 174 the cam 176 moves the switch arm 177 to the right, as shown in FIGURE 7, to disengage contact 178 and engage contact 179.

The moving of the cycle timer arm 177 in the manner previously described starts a new cycle of operation by using adsorber 71 in this cycle instead of adsorber 70.

The engaging of cycle timer arm 177 with contact 179 de-energizes valve motors 59, 77 and 84 and energizes valve motors 61 and 89. This energizing of motors 61 and 89 moves dampers 60 and 88, respectively, to their dotted line positions. The de-energizing of motor 84 permits damper 83 to return to its solid line position and the dampers 58 and 76 are similarly permitted to return to their dotted line position. This means that air from the blower 79 now is directed by way of line 81, valve 82, line 78 and valve 77 down through the adsorber 70 and through valve 56 and line 74 into the exhaust line 49 which exhausts to ambient atmosphere. This air flow downwardly through the adsorber 70 serves to reactivate the adsorber by removing adsorbed carbon dioxide.

The de-energizing of valve motor 84, as previously described, and the resulting movement of the damper to its solid line position, as shown in FIGURE 1, again pulses air switch 85 for momentary contact of its arm 222 with the contact 221 so that the whole cycle begins over again, as previously described, except now adsorber 71 is in the system to initially receive gases from the condenser 26 while the adsorber 70 is being reactivated with air removing carbon dioxide therefrom as described.

The carbon dioxide timer 183 and oxygen timer 184 are adjustable, as previously described, to provide the desired operating conditions. In one embodiment the gases from the condenser were passed upwardly through adsorber 70 (or 71) for approximately 0.8 minute to remove excess air and vent it to the ambient atmosphere and leave the desired amount of oxygen in the selected one of the adsorbers for later use in the storage chamber 69. The carbon dioxide timer was set so as to allow the gases rich in carbon dioxide from the condenser, at another period in the operating cycle, to by-pass the adsorbers for approximately 2.7 minutes and pass directly to the storage chamber 69. The period of time in which the carbon dioxide free gases, as well as the remaining oxygen left in one of the adsorbers, were passed from the adsorber to the storage chamber 69 was approximately 5.2 minutes. The start-up time during which the burner gases were vented to the ambient atmosphere by the by-pass valve 45 was about 15 minutes.

The catalytic combustion provided by the apparatus of this invention together with cooling of the catalyst bed permits control of the temperature of combustion within a practical range of about 1200–2000° F. Under these conditions the products of combustion have no measurable amounts of oxides of nitrogen.

In a preferred apparatus the air that is provided by the blower to the burner is preferably in about 5% excess over that required for complete combustion of the fuel.

In practical embodiments of the invention the percentage of oxygen in the atmosphere supplied to the storage chamber is between 1 and 10% by volume. In most instances, the amount of carbon dioxide in this atmosphere is preferably between about 1 and 15% by volume.

The catalyst used in the burner of this apparatus is of the type previously described in Bedrosian et al. Patent 3,102,778, also assigned to the same assignee as the present application. Thus, a typical catalyst is a chrome-alumina catalyst containing 20% chromic oxide in the form of ⅛ inch extruded pellets.

The amount of carbon dioxide supplied to the storage chamber 69 and the amount of oxygen supplied to the storage chamber are controlled by the timers 183 and 184, as previously described. The interrelationship of the various variable controls is shown on the graph of FIGURE 9. This figure illustrates conditions of a typical catalytic burner producing exhaust gases containing 0.8% oxygen and 12.5% carbon dioxide. The abscissa of the graph gives the percentage of oxygen that is desired in the storage chamber with the amounts varying from 0% to 6%. The ordinate of the graph gives the amount of carbon dioxide desired in the storage chamber between 0% and 12.5%. The generally vertical slope lines marked 0.0 to 1.00 progressing from the lower right-hand corner to the upper left-hand corner of the graph are the purge times, giving the time in minutes during which burner gases are passed up through each adsorber in turn to purge the adsorber of the desired amount of air and to retain the desired amount of air in order to provide the preselected quantity of oxygen in the storage chamber. The generally horizontally sloped lines marked at the right-hand side of the graph give the by-pass time in minutes during which the adsorber is by-passed and the carbon dioxide rich gases are passed directly into the storage chamber in the manner previously described through valves 45, 51 and 65 and interconnecting conduits 44, 50, 62, 63 and 68. As can be seen, this time varies from zero to 20 minutes.

Thus, to provide an atmosphere in the storage chamber of 2% oxygen and 4% carbon dioxide, the purge time during which the burner gases were passed through the adsorber to remove excess oxygen therefrom would be about 0.8 minute. The by-pass time during which carbon dioxide rich gases from the burner were passed directly into the chamber, by-passing the adsorber, would be about 2.6 minutes. The other conditions for producing other percentages of oxygen and carbon dioxide from the burner can of course be easily determined from the graph of FIGURE 9.

Each adsorber not only removes carbon dioxide from the gaseous products of combustion but also removes hydrocarbons including alkylenes, especially ethylene, which are often quite harmful to the stored products.

Having described the invention as related to the embodiment shown in the accompanying drawings, it is intended that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus for providing and maintaining an oxygen containing atmosphere in a receiver at a preselected level of oxygen content, comprising: means for generating a gas mixture comprising carbon dioxide; a place of disposal; adsorption means for removing undesirable amounts of preselected constituents including said carbon dioxide from said gas mixture; a source of air; means for directing said air through said adsorption means to remove and dispose of said preselected constituents including carbon dioxide, at least a portion of said air being retained by said adsorption means; means for directing said gas mixture through said adsorption means to said place of disposal for a first predetermined time period to remove a preselected portion of said air retained in said adsorption means; and means for then directing said gas mixture through said adsorption means to said receiver for a second predetermined time period to remove said constituents from said gas mixture, and to transfer the unremoved portion of said gas mixture and the remaining quantity of said air retained in said adsorption means from said adsorption means to said receiver.

2. The apparatus of claim 1 wherein there are provided means for periodically by-passing said adsorption means with said gas mixture and flowing directly into said receiver for a third predetermined time period to provide carbon dioxide rich atmosphere to said receiver.

3. The apparatus of claim 1 wherein said means for generating comprises a combustion means for providing a gas mixture comprising said carbon dioxide and oxygen, said source of air provides pressurized air, and there are provided means for initially directing said mixture to said place of disposal prior to said directing of said mixture through said adsorption means.

4. The apparatus of claim 3 wherein there are provided means for periodically by-passing said adsorption means with said mixture and flowing directly to said receiver to provide carbon dioxide rich atmosphere thereto.

5. The apparatus of claim 4 wherein said means for directing air through said adsorption means, said means for directing said mixture through said adsorption means to said place of disposal, and said means for directing said mixture through said adsorption means to said receiver comprises a cycle of operation thorugh said adsorption means, and there are provided a second adsorption means, means for then repeating said cycle through said second adsorption means while isolating said first adsorption means from said gas mixture providing means and receiver, and means for directing air through said first adsorption means during said isolating to remove carbon dioxide from said first adsorption means.

References Cited

UNITED STATES PATENTS

| 3,203,771 | 8/1965 | Brown et al. | 23—281 |
| 3,205,049 | 9/1965 | Lannert et al. | 23—281 |

JOSEPH SCOVRONEK, *Primary Examiner.*

U.S. Cl. X.R.

21—58; 23—288; 55—387; 99—157, 189, 271; 252—372